United States Patent
Busch

(10) Patent No.: US 7,092,828 B2
(45) Date of Patent: Aug. 15, 2006

(54) METHOD FOR DETECTING COMMUNICATION IMPULSES OF A FAN MOTOR AND CIRCUIT ARRANGEMENT FOR CARRYING OUT SAID METHOD

(75) Inventor: Peter Busch, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 10/999,830

(22) Filed: Nov. 30, 2004

(65) Prior Publication Data

US 2005/0149292 A1 Jul. 7, 2005

Related U.S. Application Data

(63) Continuation of application No. PCT/DE03/00951, filed on Mar. 21, 2003.

(30) Foreign Application Priority Data

May 31, 2002 (DE) ................ 102 24 270

(51) Int. Cl.
G01R 15/00 (2006.01)
(52) U.S. Cl. .................... 702/57; 324/76.39
(58) Field of Classification Search ............... 702/57, 702/68, 60, 64–66, 71, 78, 79, 96, 176, 178, 702/182, 183, 198; 324/76.39; 318/685; 388/811
See application file for complete search history.

(56) References Cited

U.S. PATENT DOCUMENTS

| | | | |
|---|---|---|---|
| 3,237,028 A | | 2/1966 | Gibbons |
| 3,314,062 A | | 4/1967 | Pommerening |
| 3,855,101 A | * | 12/1974 | Wilson ................ 204/406 |
| 4,721,865 A | | 1/1988 | Tallaron et al. |
| 4,734,632 A | * | 3/1988 | Kamikura et al. ......... 318/685 |
| 5,017,854 A | * | 5/1991 | Gully et al. ............ 318/811 |
| 5,825,972 A | * | 10/1998 | Brown ................ 388/811 |
| 6,060,879 A | * | 5/2000 | Mussenden ............ 324/76.39 |

FOREIGN PATENT DOCUMENTS

| | | |
|---|---|---|
| DE | 198 07 253 C1 | 9/1999 |
| DE | 198 34 108 A1 | 2/2000 |
| DE | 100 21 503 A1 | 11/2001 |
| DE | 100 28 033 A1 | 12/2001 |
| JP | 59028721 | 2/1984 |
| JP | 5037808 | 2/1993 |

* cited by examiner

Primary Examiner—Hal Wachsman
Assistant Examiner—Mohamed Charioui
(74) Attorney, Agent, or Firm—Cohen, Pontani, Lieberman & Pavane

(57) ABSTRACT

A method for detecting commutation pulses of a fan motor with continuous measurement and storage of voltage values that are proportional to the fan current within predetermined time intervals. The measured voltage values are continuously evaluated by comparing two measured values that were obtained at different times. A result signal is outputted if the deviation between the compared measured values fulfills a predetermined constraint.

12 Claims, 3 Drawing Sheets

METHOD FOR DETECTING COMMUNICATION IMPULSES OF A FAN MOTOR AND CIRCUIT ARRANGEMENT FOR CARRYING OUT SAID METHOD

RELATED APPLICATIONS

This is a continuation of International Application No. PCT/DE03/00951, filed on Mar. 31, 2003, which claims priority from German Patent Application No. 102 24 270.4, filed on May 31, 2002 the content of which is hereby incorporated by reference.

FIELD OF THE INVENTION

The invention pertains to a method for detecting commutation pulses of a fan motor. The invention also pertains to a circuit arrangement for carrying out this method.

BACKGROUND OF THE INVENTION

High-performance computer power supply units, in particular, require electronically commutated fans in order to be cooled. The fan speed is measured electronically for control and adjustment purposes.

Until now, one available option was the utilization of special fans for this purpose. These special fans deliver an internal clock signal of the electronic commutation outward via an additional line. In this case, it is problematic that fans of this type have a significantly higher price such that their utilization should be avoided whenever possible.

It is also known to detect current fluctuations of a fan by means of a shunt, wherein the measuring signal is extracted by means of a filter circuit. A signal that contains the speed information is obtained by means of differentiation and subsequent pulse shaping.

The commutation process can be detected due to the fact that the current changes significantly within a very short period of time when a commutation occurs. The rate of change is higher than the rate of change of the current caused by the back e.m.f. of the motor by at least a factor of 10.

Until now, these commutation pulses were obtained by removing their direct component and shaping the portions of the remaining alternating component with a high rate of change into pulses. A few methods operate with fixed switching thresholds. There exist methods that are carried out with the aid of a capacitor as well as methods that are carried out on a digital basis with D/A converters.

One method that operates on a digital basis with a D/A converter is known from DE 100 21 503 A1. In this case, voltage signals that are proportional to a motor current are evaluated. A comparator that controls an incrementer/decrementer based on a comparison with a threshold value is utilized for this purpose. The count of the incrementer/decrementer then defines the threshold value for the comparator after a digital/analog conversion.

The direct component is removed from the voltage values in this fashion. The commutation signal can be detected based on the sequence of the output signals of the comparator that reflect the alternating component of the voltage values.

However, this method does not function satisfactorily if fans of different types or by different manufacturers should be operated with the same control circuit without having to change adjustments.

In order to allow the monitoring of different fan types that have different operating currents, it is possible to determine the maximum rate of change of the fan current and to utilize a certain percentage thereof as the switching threshold for detecting a commutation. However, this method has serious disadvantages. If the fan becomes jammed, a connected monitoring unit must be able to detect the blocking of the fan. It is absolutely imperative to prevent the incorrect addition of commutation pulses although the fan is not turning. However, this is exactly what occurs in such a detection method, namely as described below. If a commutation no longer takes place due to such a blockage situation, the operating current will cease to fluctuate such that the alternating component drops to zero.

Consequently, the switching threshold for detecting a commutation pulse also drops to a minimum value. If the operating voltage of the jammed fan fluctuates without the fan turning, for example, if other consumers such as hard disks or processors with active energy-saving functions generate abrupt load variations on the same power supply, the current of the jammed fan also fluctuates because it exhibits ohmic characteristics during a blockage.

This leads to the commutation detection circuit incorrectly detecting pulses although the fan is jammed. Consequently, a jammed fan can no-longer be reliably detected and the device to be cooled may quickly overheat.

SUMMARY OF THE INVENTION

One object of the present invention is to enable the detection of commutation pulses when different types of fans are utilized, wherein the incorrect detection of commutation pulses is reliably prevented when the fan is jammed.

This and other objects are attained in accordance with one aspect of the present invention directed to a method for detecting commutation pulses of a fan motor with continuous measurement and storage of voltage values that are proportional to the fan current within predetermined intervals. The measured voltage values are continuously evaluated by comparing two measured values that were obtained at different times. A result signal is outputted if the deviation between the compared measured values fulfills a constraint.

One advantage of the above-described method according to an aspect of the invention is that the fan-dependent direct component is also taken into account in addition to the time rate of change of the fan current. This is achieved by utilizing the measured voltage itself rather than its time derivative for the evaluation.

In this case, it is particularly advantageous that the respective ratio between two measured values is compared with a limiting value.

The evaluation can be carried out in a particularly simple fashion if the measured voltage values are stored in counters in the form of time characteristics that are dependent on the measured voltage values, wherein the logarithm of the measured voltage values is formed during the conversion into time characteristics.

DETAILED DESCRIPTION OF THE DRAWINGS

According to an embodiment of the invention, a measurement and a time-dependent evaluation of the ratio between successive voltage values are carried out, for example, on a shunt. This makes it possible to adjust the current switching threshold of the commutation pulse detection to a ratio that is higher than the highest occurring fluctuations in the operating voltage. If the maximum permissible fluctuation in the operating voltage is ±5% and the current switching threshold is adjusted, for example, to ±10% or more, a glitch pulse can no longer be generated if abrupt variations in the operating voltage occur and the fan is blocked, namely because the current fluctuations also can only lie at +5%. The current change of the fan is measured within a defined duration, for example, within 2% of the interval between two commutation pulses of the fan, in order to ensure that a rapid change has occurred. Slow current changes consequently do not reach the current switching threshold within the defined duration such that no output signal is triggered.

This detection no longer depends on the absolute value of the fan supply current, i.e., it is suitable for all fan types without adaptations.

Figure 1:
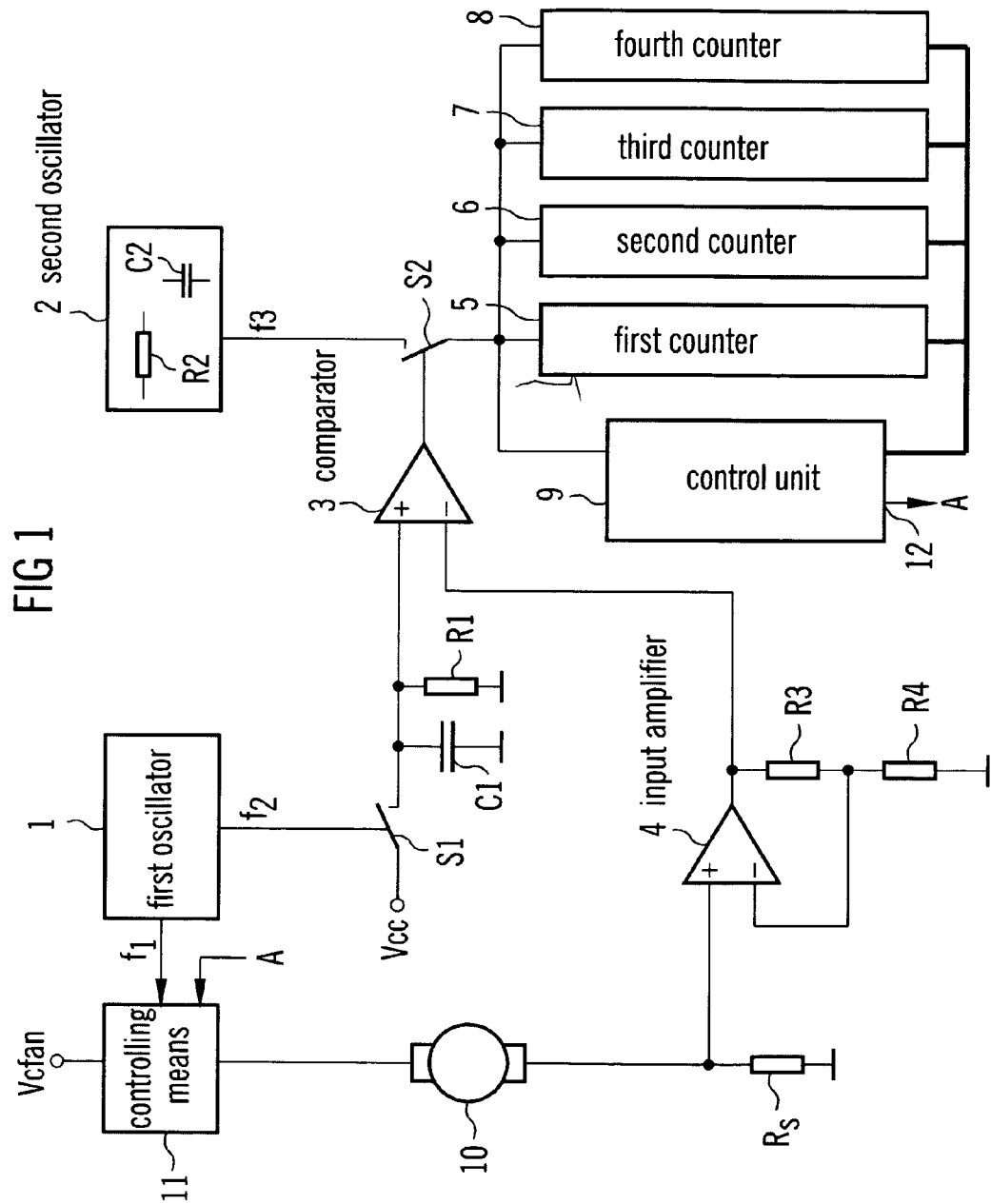
FIG. 1 shows a first embodiment of a circuit arrangement.

According to FIG. 1, the commutation pulse detection according to the invention comprises a first oscillator 1, a second oscillator 2, a capacitor C1 with a charging and discharging device formed by a switch S1 and a resistor R1, a comparator 3, the output of which controls a switch S2, an input amplifier 4, the amplification of which is adjusted with two resistors R3 and R4, several counters, namely four 8-bit counters 5, 6, 7 and 8, and a sequence control unit 9. In this case, the first oscillator 1 generates a frequency f2 that corresponds to a multiple of the nominal speed f1 of the fan. This means that the ratio between the nominal speed f1 of the fan and this frequency f2 is constant.

The second oscillator 2, in contrast, generates counting pulses with a frequency f3 for the counting processes required during the current measurement.

The fan current tapped at a shunt RS is fed to the input of the input amplifier 4 and output in the form of a voltage by said input amplifier, namely by amplifying the voltage drop of the fan current at RS. The capacitor C1 that was previously charged to Vcc is discharged via the resistor R1 in the cycle of the first oscillator 1. This takes place, for example, 100-times within the time interval between two fan commutations. The respectively resulting discharge curve is an exponential function.

During the discharge, the discharge curve is compared with the instantaneous fan current at the output of the input amplifier 4 by means of a comparator 3. As long as the capacitor C1 has a higher voltage than the input amplifier 4, the second oscillator 2 is switched through to the counters via the switch S2. This means that the respectively activated counters receive a number of counting pulses that exactly corresponds to a logarithmic representation of the instantaneous fan current. In this case, a low number corresponds to a high current and a high number corresponds to a low current.

In order to carry out a ratio-based comparison between successive measured values of the fan current, the differences between the successive measured values need to be investigated because logarithmic numerical values represent a quantity for their ratio to one another. This means that the comparison is particularly simple because the differences between the counts of the counters can be used for creating the ratios.

The process of obtaining the differential values is described in greater detail below, wherein four 8-bit counters are utilized in this embodiment. In the following description, the count of the first counter 5 is identified by the reference symbol Z1, the count of the second counter 6 is identified by the reference symbol Z2, the count of the third counter 7 is identified by the reference symbol Z3 and the count of the fourth counter 8 is identified by the reference symbol Z4. A sequential counter in the sequence control unit 9 serially addresses the counters via control line 20 with a gate control signal which selectively enables or disables the respective counters. In this case, one distinguishes between four different counting sequences.

Counting Sequence 1:

The counting sequence 1 begins by setting the fourth counter 8 to "0," switching off the switch S1, discharging the capacitor C1 and switching on the switch S2. Counting pulses of the second oscillator 2 now increment the counters 8 and 5. Both counters 5 and 8 stop when S2 is switched off, but no later than after the 127th counting pulse because the most significant bit of the 8-bit counters is required for obtaining the differential values.

The number of summed up counting pulses for the fan current after the time interval t is identified by the reference symbol Z(t), with Z(t)≦127. The count of the fourth counter 8 consequently is "Z4=Z(t)." Subsequently, the count of the fourth counter 8 is inverted bit-by-bit. The inversion has the same effect as a subscription "255−Z(t)." The count of the fourth counter 8 now is "Z4=255−Z(t)." The count of the first counter 5 was not set to "0" at the beginning, and its count in the steady state before the beginning of the counting process is "Z1=255−Z(t−3)."

After the counting process (after the time interval t), the new count of the first counter 5 is "Z1=255−Z(t−3)+Z(t)." After converting the equation and transforming "255" into "−1," one obtains "Z1=Z(t)−Z(t−3)−1." The count of the first counter 5, i.e., Z1, represents the ratio between the fan current at that time t and the current at that time t−3 (minus 1). This is the reason why Z1 is now compared with two fixed numerical limiting values that respectively represent a positive current rate of change P or a negative current rate of change N in the form of a ratio or percentage. If the amount of the current rate of change is higher than P or higher than N, a fan commutation pulse is present that is detected by the sequence control unit 9 and signaled in the form of a "fan pulse" at the output 12.

For example, the limiting value for the positive rate of change is P=248 and the limiting value for the negative rate of change is N=15. The number 248 corresponds to the inverse value of 7, i.e., this value is obtained if Z(t) is smaller than the value Z(t−3) by (7+1). If the count of Z1 is lower than P=248, Z(t) was lower than Z(t−3) by at least (8+1)=9.

A lower numerical value means a higher fan current, i.e., this instance pertains to a positive current change that was detected as a commutation. However, if the count of the first counter 5 is higher than N=15, Z(t) was higher than Z(t−3) by at least (15+1)=16. A higher numerical value means a lower fan current, i.e., this instance pertains to a negative current change that was detected as a commutation. Consequently, the detection of a commutation always takes place when N<Z1<P. If this is the case, the output 12 is set to "1" in accordance with a "fan pulse" signal, wherein said output is set to "0" if this is not the case. Any ambiguity of the result is prevented by limiting the counter pulses to 127.

The capacitor C1 is now charged again.

The other counting sequences take place analogously, however, advanced by respectively one counter position.

Counting Sequence 2:

The counting sequence 2 begins by setting the first counter 5 to "0," switching off the switch S1, discharging the capacitor C1 and switching on the switch S2. Counting pulses of the second oscillator 2 now increment the first counter 5 and the second counter 6. The two counters 5 and 6 stop when the switch S2 is switched off, but no later than after the 127th counting pulse because the most significant bit of the 8-bit counters is required for forming the differential values.

The number of counting pulses for the fan current at the time t+1 is identified by the reference symbol $Z(t+1)$, with $Z(t+1) \leq 127$. The count of the first counter 5 consequently is "$Z1=Z(t+1)$." Subsequently, the count of the first counter 5 is inverted bit-by-bit. The count of the first counter 5 now is "$Z1=255-Z(t+1)$." The count of the second counter 6 was not set to "0" at the beginning, and its count in the steady state before the beginning of the counting process is "$Z2=255-Z(t-2)$."

After the counting process, i.e., at the end of the time interval (t+1), the new count of the second counter 6 is "$Z2=255-Z(t-2)+Z(t+1)=Z(t+1)-Z(t-2)-1$." The count of the second counter 6, i.e., Z2, represents the ratio between the fan current at that time t+1 and the current at that time t−2 (minus 1). Z2 is now again compared with two fixed numerical limiting values that respectively represent a positive current rate of change P or a negative current rate of change N in the form of a ratio or percentage. A commutation is detected when N<Z2<P. If this is the case, the output 12 is set to "1" in accordance with a "fan pulse" signal, wherein said output is set to "0" if this is not the case.

The capacitor C1 is now charged again.

Counting Sequence 3:

The counting sequence 3 begins by setting the second counter 6 to "0," switching off the switch S1, discharging the capacitor C1 and switching on the switch S2. Counting pulses of the second oscillator 2 now increment the second counter 6 and the third counter 7. The two counters 6 and 7 stop when the switch S2 is switched off, but no later than after the 127th counting pulse because the most significant bit of the 8-bit counters is required for forming the differential values.

The number of counting pulses for the fan current at the time t+2 is identified by the reference symbol $Z(t+2)$, with $Z(t+2)<127$. The count of the second counter 6, i.e., Z2, consequently is "$Z2=Z(t+2)$." Subsequently, the count of the second counter 6 is inverted bit-by-bit. The count of the second counter 6 now is "$Z2=255-Z(t+2)$." The count of the third counter 7 was not set to "0" at the beginning, and its count in the steady state before the beginning of the counting process is "$Z3=255-Z(t-1)$."

After the counting process, i.e., at the end of the time interval (t+2), the new count of the third counter 7 is "$Z3=255-Z(t-1)+Z(t+2)=Z(t+2)-Z(t-1)-1$." The count of Z3 represents the ratio between the fan current at that time t+2 and the current at that time t−1 (minus 1). The count of Z3 is now again compared with two fixed numerical limiting values that respectively represent a positive current rate of change P or a negative current rate of change N in the form of a ratio or percentage. A commutation is detected when N<Z3<P. If this is the case, the output 12 is set to "1" in accordance with a "fan pulse" signal, wherein said output is set to "0" if this is not the case.

The capacitor C1 is now charged again.

Counting Sequence 4:

The counting sequence 4 begins by setting the third counter 7 to "0," switching off the switch S1, discharging the capacitor C1 and switching on the switch S2. Counting pulses of the second oscillator 2 now increment the third counter 7 and the fourth counter 8. The two counters 7 and 8 stop when the switch S2 is switched off, but no later than after the 127th counting pulse because the most significant bit of the 8-bit counters is required for forming the differential values.

The number of counting pulses for the fan current at the time t+3 is identified by the reference symbol $Z(t+3)$, with $Z(t+3) \leq 127$. The count of the third counter 7, i.e., Z3, consequently is "$Z3=Z(t+3)$." Subsequently, the count of the third counter 7 is inverted bit-by-bit. The count of the third counter 7 now is "$Z3=255-Z(t+3)$." The count of the fourth counter 8 was not set to "0" at the beginning, and its count in the steady state before the beginning of the counting process is "$Z4=255-Z(t)$."

After the counting process, i.e., at the end of the time interval (t+3), the new count of the fourth counter 8 is "$Z4=255-Z(t)+Z(t+3)=Z(t+3)-Z(t)-1$." Z4, represents the ratio between the fan current at that time t+3 and the current at that time t (minus 1). The count of Z4 is now again compared with two fixed numerical limiting values that respectively represent a positive current rate of change P or a negative current rate of change N in the form of a ratio or percentage. A commutation is detected when N<Z4<P. If this is the case, the output 12 is set to "1" in accordance with a "fan pulse" signal, wherein said output is set to "0" if this is not the case.

The capacitor C1 is now charged again.

The counting sequences are then repeated, i.e., counting sequence 5 is identical to counting sequence 1, counting sequence 6 is identical to counting sequence 2, etc.

The time constant of the capacitor discharge of C1 via R1 is chosen such that 127 pulses of the second oscillator 2 can be counted over the input voltage range to be measured.

For example, if a detection range between 5V and 50 mV should be adjusted at the output of the input amplifier 4, the capacitor C1 needs to be discharged from 5V to 50 mV via R1 within 127 pulses of the second oscillator 2.

In order to realize a sufficient time resolution of the current while the fan rotates at a very high speed, it may be required to operate the second oscillator 2 with a very high frequency f3. According to one additional development of the invention, this can be prevented by designing the input amplifier 4 such that its amplification can be changed over.

Figure 2:
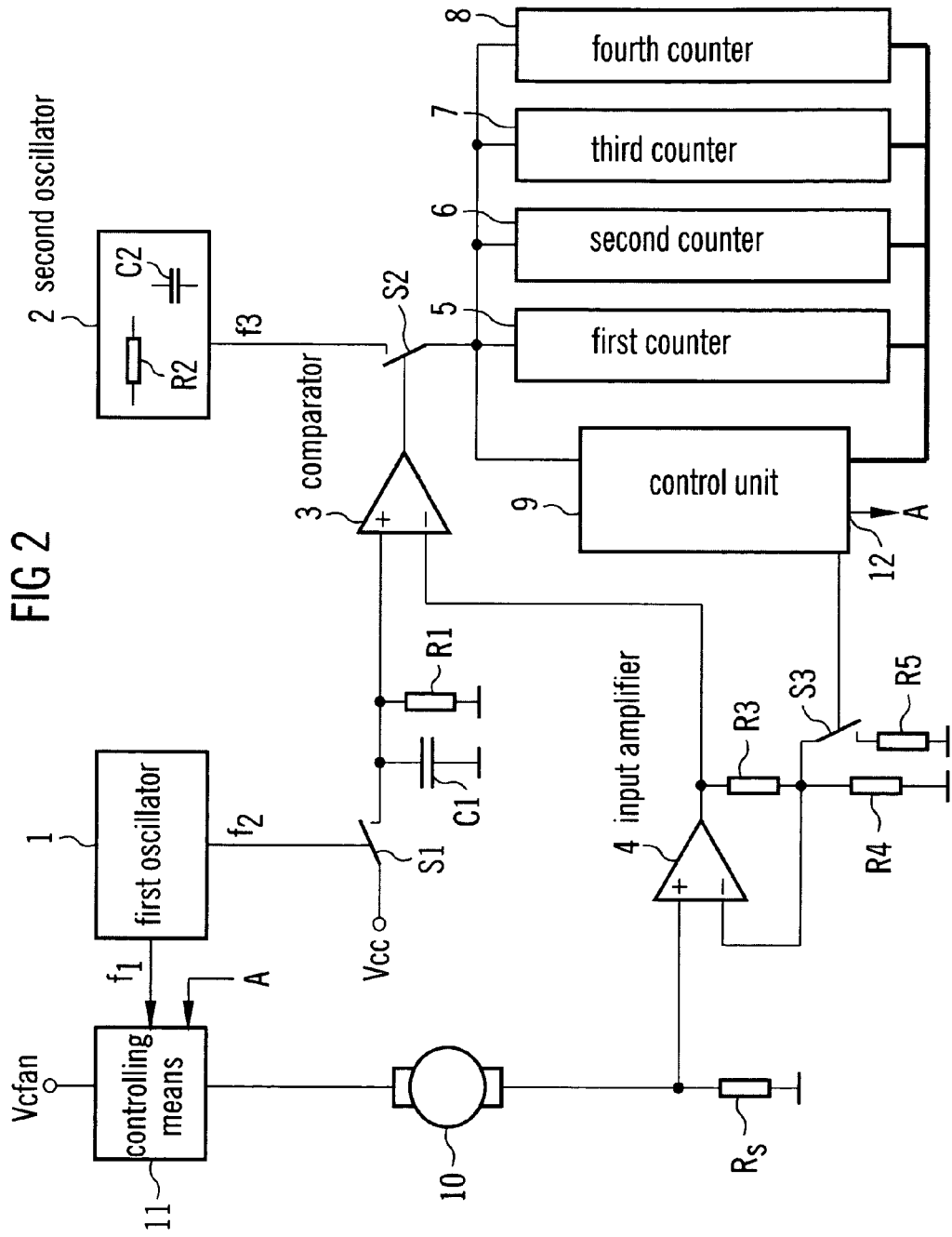
FIG. 2 shows a second embodiment of a circuit arrangement with a range change-over switch.

This is illustrated in FIG. 2. If necessary, a resistor R5 is connected in parallel to the resistor R4 in order to cause a defined increase in amplification. For example, if the output of the input amplifier 4 needs to be adjusted to a detection range between 5V and 50 mV, this range is divided into two partial ranges. If the amplification of the input amplifier 4 is changed over, for example, such that it is increased tenfold, the conversion of the input voltage by means of the resistor R1, the capacitor C1 and the second oscillator 2 needs to sweep over an input voltage range between 5V and 500 mV within the same duration as before. This means that the same accuracy as before is achieved while the second oscillator 2 only requires half of the previous operating frequency due to the amplification change-over, namely because a reduction of the ratio from 100 to 10 corresponds to a reduction by half of the result in a logarithmic conversion.

The counters 5–8 are now only realized in the form of 7-bit counters, 6 bits of which are used for the counting process. Consequently, the highest count during the counting process is no longer 127 as in the previously discussed embodiment, but rather 63. The change-over of the amplification and consequently the range takes place as a result of a comparison between the respectively preceding count, i.e., at the time t−1, and fixed threshold values that indicate an imminent overranging.

In order to prevent a commutation event from being missed due to an incorrect prognosis caused by a range change-over, a certain overlap needs to exist between the lower range and the upper range. This overlapping range is dependent on the percentage or ratio, from which on the change in the input voltage is detected as a commutation.

The overlapping range needs to be at least twice as large as the ratio required for detecting a commutation.

If a commutation is defined as an input voltage change of ±10%, the amplification change-over could lie at a factor of 10–20%, i.e., at a factor of 8. The time constant of the discharge of the capacitor C1 via the resistor R1 is simultaneously chosen such that a voltage range of 10-times+ 20%=12-times, i.e., between 5V and 417 mV, is created during a cycle of 6 bits=63 counting pulses. The detection device operates normally as described with reference to counting sequences 1–4 if it is set to the low-amplification range, i.e., when high current values occur. However, if the detection device is switched over to the eightfold amplification, this circumstance is stored in the form of a 1-bit amplification value for the subsequent comparison with P and N because the comparison values subsequently need to be adapted, if so required.

In the previous example without a range change-over, a ratio of 100 corresponded to a count of 127. In this case, a ratio of 8 approximately corresponds to a count of 57.

Four instances may occur depending on the time at which the range is changed over. Instances 1 and 2 are discussed below with reference to counting sequence 1, wherein the range is changed over to an eightfold amplification.

The counting sequence 1 begins by switching the amplification to 8, setting the amplification bit to "1," setting the fourth counter 8 to "0," switching off the switch S1, discharging the capacitor C1 and switching on the switch S2. Counting pulses of the second oscillator 2 now increment the fourth counter 8 and the first counter 5.

Both counters 5 and 8 stop when the switch S2 is switched off, but no later than the time at which the fourth counter 8 reaches a count of 63, namely because the most significant bit of the 7-bit counters is required for forming the differential values. The number of counting pulses for the fan current at that time t is identified by the reference symbol Z(t), with Z(t)≦63. The count of the fourth counter 8 consequently is "Z=Z(t)." Subsequently, the count of the fourth counter 8 is inverted bit-by-bit.

The inversion has the same effect as a subtraction "127−Z(t)." The count of the fourth counter 8, i.e., Z4, now is "Z4=127−Z(t)." Instance 1 or instance 2 now applies to the first counter 5.

Instance 1:

In this case, the eightfold amplification is already switched on at the time t−3. The count of the first counter 5 was not set to "0" at the beginning such that its count in the steady state before the counting process begins is "Z1=127− Z(t−3)." After the counting process (after the time interval t), the new count of the first counter 5 is "Z1=127−Z(t−3)+Z (t)." Both values Z(t−3) and Z(t) actually would have to be increased by the correction value 57 that corresponds to the eightfold amplification. However, this correction value is extracted during the subtraction such that the process can continue normally.

Z1 is now compared with the two fixed numerical limiting values that respectively represent a positive current rate of change P and a negative current rate of change N in the form of a ratio or percentage. If the amount of the current rate of change in the first counter 5 is higher than P or higher than N, a fan commutation pulse is present that is detected by the sequence control unit 9 and signaled at the output 12. In this case, a commutation is detected if N<Z1<P applies.

Instance 2:

In this case, the normal amplification is still switched on at the time t−3. The count of the first counter 5 also was not set to "0" at the beginning such that its count in the steady state before the counting process begins is "Z1=127−Z(t− 3)." After the counting process (after the time interval t), the new count of the first counter 5 is "Z1=127−Z(t−3)+Z(t)."

The value Z(t) actually would have to be increased by the correction value 57 that the corresponds to the eightfold amplification. However, an addition is complicated and the comparison with the limiting values P and N would also take place directly thereafter in this case. Consequently, Z1 is instead compared with two corrected fixed numerical limiting values that respectively represent a positive current rate of change (P−57) and a negative current rate of change (N−57) in the form of a ratio or percentage. If the current rate of change according to Z1 lies outside the values P−57 and N−57, a fan commutation pulse is present that is detected by the sequence control unit 9 and signaled at the output 12. In this case, a commutation is detected if N−57<Z1<P−57 applies.

Instances 3 and 4 are discussed below with reference to counting sequence 1, wherein the range is changed over to the normal amplification.

The counting sequence 1 begins by switching the amplification to normal, i.e., by not connecting R5 in parallel, setting the amplification bit to 0, setting the fourth counter 8 to "0," switching off the switch S1, discharging the capacitor C1 and switching on the switch S2. Counting pulses of the second oscillator 2 now increment the counter 8 and the counter 5. Both counters stop when the switch S2 is switched off, but no later than the time at which the fourth counter 8 reaches a count of 63, namely because the most significant bit of the 7-bit counters is required for forming the differential values.

The number of counting pulses for the fan current at the time t is identified by the reference symbol Z(t), with Z(t)<63. The count of the fourth counter 8 consequently is Z4=Z(t). Subsequently, the count of the fourth counter 8 is inverted bit-by-bit. The inversion has the same effect as a subtraction "127−Z(t)." The count of the fourth counter 8, i.e., Z4, now is "Z4=127−Z(t)." Instance 3 or 4 now applies to the first counter 5.

Instance 3:

In this case, the normal amplification (without RS) is already switched on at the time t−3. The count of the first counter 5 in the steady state before the counting process was "Z1=127−Z(t−3)." After the counting process (after the time interval t), the new count of the first counter 5, i.e., Z1, is "Z1=127−Z(t−3)+Z(t)."

The count of Z1 is now compared with the two fixed numerical limiting values that respectively represent a positive current rate of change P and a negative current rate of change N in the form of a ratio or percentage. If the current rate of change in Z1 lies outside P and N, a fan commutation pulse is present that is detected by the sequence control unit 9 and signaled in the form of a "fan pulse" at the output 12. A commutation is detected if N<Z1<P applies.

Instance 4:

In this case, the eightfold amplification is switched on at the time t−3. The count of the first counter 5 in the steady state before the counting process was "Z1=127−Z(t−3)."

The amplification bit is set to 1, i.e., the corrected value of Z1 actually would be 127−(Z(t−3)+57). After the counting process (after the time interval t), the new count of the first counter 5 is "Z1=127−Z(t−3)+Z(t)." The value Z1 actually would have to be decreased by the correction value 57 that corresponds to the eightfold amplification at the time t−3. However, a subtraction is complicated and the comparison with the limiting values P and N would also take place directly thereafter in this case. Consequently, Z1 is instead compared with two corrected fixed numerical limiting values that respectively represent a positive current rate of change (P+57) and a negative current rate of change (N+57) in the form of a ratio or percentage. If the current rate of change in Z1 lies outside the values P+57 and N+57, a fan commutation pulse is present that is detected by the sequence control unit 9 and signaled in the form of a "fan pulse" at the output 12. In this case, a commutation is detected if N+57<Z1<P+57 applies.

Figure 3:
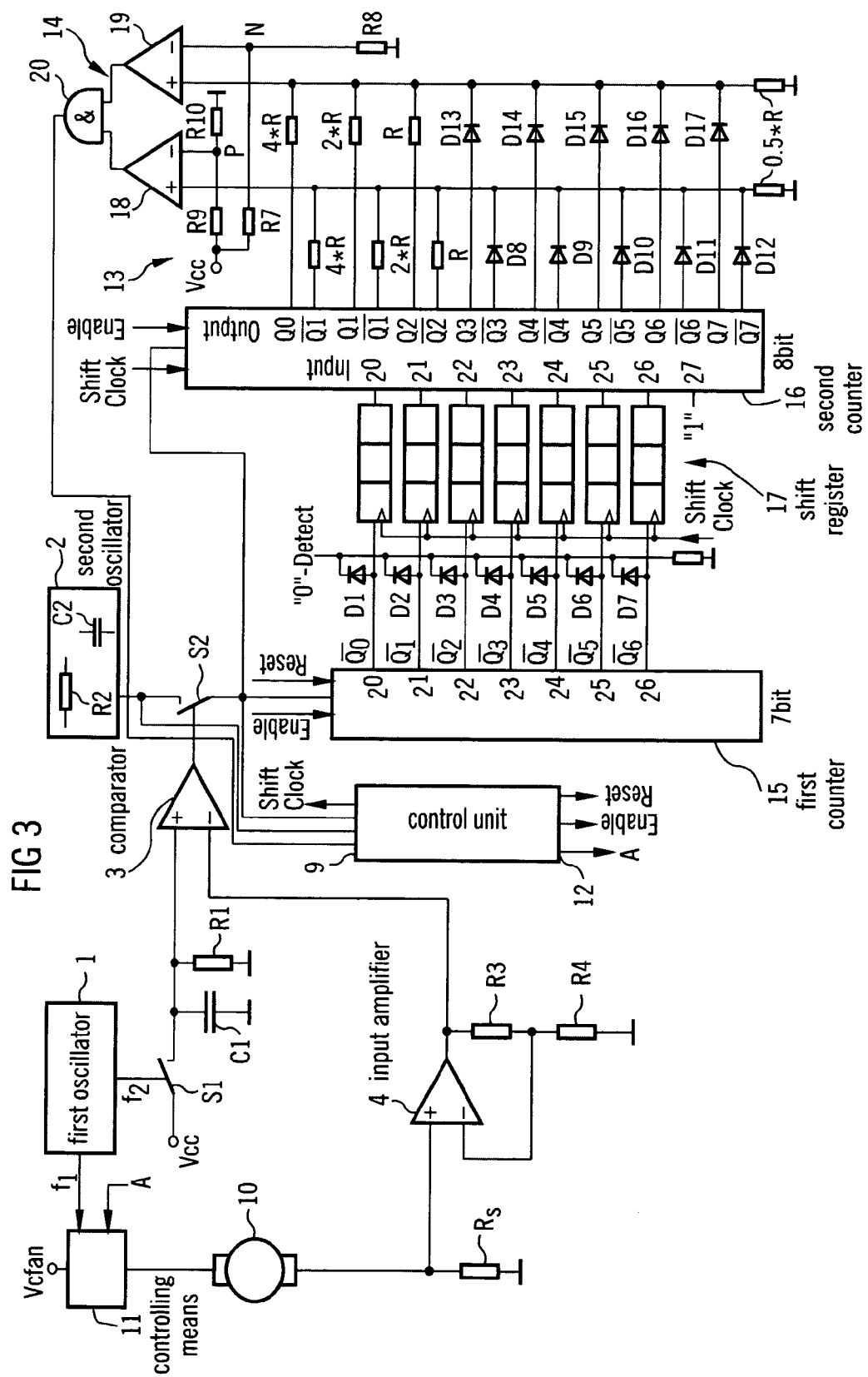
FIG. 3 shows a third embodiment of a circuit arrangement.

According to another advantageous embodiment, the second and the third counter 6 and 7 are replaced with a shift register 17. FIG. 3 shows such an arrangement with a three-stage shift register 17. With respect to its function, this embodiment corresponds to an arrangement according to FIG. 1 with five counters.

Each counting sequence begins with a new pulse from the first oscillator 1.

The counting sequence 1 begins by transferring the inverse count of the first counter 15 into the three-stage shift register with a signal "Shift-Clock" from the sequence control unit 9, wherein the oldest value Z(t−4) is simultaneously loaded from the shift register 17 into the second counter 16 as a starting value.

Subsequently, the first counter 15 is set to "0," the switch S1 is switched off, the capacitor C1 is discharged via R1 and the switch S2 is switched on. The counting pulses of the second oscillator 2 now increment the first counter 15 and the second counter 16. Both counters 15 and 16 stop when S2 is switched off, but no later than after the 127th counting pulse (easily detectable, e.g., if the signal "0"-Detect=0), namely because the most significant bit of the second counter 16 cannot be utilized due to the formation of the differential values.

The number of counting pulses for the fan current at that time t is identified by the reference symbol Z(t), with Z(t)≦127. Consequently, the count of the first counter 15 is "Z1(t)=Z(t)." The count of the second counter 16 in the steady state before the beginning of the counting sequence 1 had the inverse value of Z(t−4)=255−Z(t−4), namely because this value was measured in the first counter 15 at a time t−4 and shifted into the second counter 16 in inverse form through the three shift register stages.

The shift register stages are controlled in the cycle of the first oscillator 1 with the signal "Shift-Clock." During each new current measurement, the preceding measured value consequently is respectively shifted toward the right by one position until it is ultimately loaded into the second counter 16 as a starting value.

Consequently, the second counter 16 has the following value at the end of the counting sequence 1:

$$Z2(t)=255-Z(t-4)+Z(t)=Z(t)-Z(t-4)-1$$

The count of the second counter 16, i.e., Z2, consequently represents the ratio between the fan current at the time t and the current at the time t−4 (minus 1). Z2 is now again compared with two fixed numerical limiting values that respectively represent a positive current rate of change P and a negative current rate of change N in the form of a ratio or percentage. If P and N have relatively low values, the comparison may be carried out with the simplified circuit described below:

Z2(t) is converted into an analog voltage by means of a simplified digital/analog converter and compared with the fixed voltage value N that is defined by the voltage divider composed of R7 and R8 in a comparator 18. This is carried out with the resistors 4*R, 2*R, R and the diodes D13–D17 and the summing resistor 0.5*R that are respectively connected to non-inverting outputs of the second counter 16.

This arrangement may be chosen for values of N that are as high as the numerical value 7. Resistors 8*R (not shown), 4*R, 2*R, R, the diodes D14–D17 and the summing resistor 0.5*R would be required in order to achieve numerical values as high as 15.

The inverse value of Z2(t)=255−Z2(t) is simultaneously convert into an analog voltage by another simplified digital/analog converter and compared with the fixed voltage value 255−P in another comparator 19. This is carried out with the resistors 4*R, 2*R, R and the diodes D8–D12 and the summing resistor 0.5*R that are connected to the inverted outputs of the second counter 16.

This arrangement may be chosen for values of P that are as high as the numerical value 7. Resistors 8*R (not shown), 4*R, 2*R, R, the diodes D9–D12 and the summing resistor 0.5*R would be required in order to achieve numerical values as high as 15. One possible embodiment is to replace diodes D9–D12 and/or D13–D17 successively by additional resistors having resistivities of 8*R, 16*R, etc. to increase the resolution of the D/A converter.

This simplified arrangement for the D/A conversion can be chosen because the more significant bits with the diode outputs are always higher than the respective comparison values N and R, i.e., the exact level of the analog voltage is not interesting in this case. Consequently, the resistors 8*R, 4*R, etc. do not have to operate as accurately as in an 8-bit D/A converter.

The results of the comparators 18 and 19 are linked in an AND-gate 20, and the result is signaled to the sequence control unit 9. If the result is equal to 1, this means that N<Z2(t)<P, i.e., that a commutation has taken place. Naturally, the result is only valid if the counting process in the second counter 16 is completed. Consequently, the sequence control unit 9 queries the result of the gate after the completion of this counting process and signals the result to the fan control 11 in the form of a fan pulse if the result was a 1.

The counting sequence 2 and all other counting sequences are identical to the counting sequence 1. In the embodiment according to FIG. 3, the sequence control unit 9 is merely responsible for the correct time sequence of the control signals.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

I claim:

1. A method for detecting commutation pulses of a fan motor, comprising the following steps:
   continuously measuring and storing voltage values that are proportional to the fan current within predetermined time intervals,
   continuously evaluating the measured voltage values by comparing two measured values that were obtained at different times, comparing a ratio between the two measured voltage values with a predetermined constraint, and outputting a result signal if the ratio between the compared measured values fulfills the predetermined constraint, the result signal indicating a commutation pulse of the fan motor.

2. The method according to claim 1, wherein the measured voltage values are converted into time characteristics that are dependent on the measured voltage values before said step of evaluating.

3. The method according to claim 2, wherein the following steps are carried out in order to determine the time characteristics that are proportional to the measured voltage values:

plotting a voltage curve, comparing the voltage curve with a measured voltage that is proportional to the fan current, and recording a first duration between the beginning of the voltage curve and the time at which the voltage curve and the measured voltage correspond to one another.

4. The method according to claim 3, wherein the voltage curve extends logarithmically.

5. The method according to claim 1, wherein the logarithms of the measured voltage values are formed and converted into time characteristics before said step of evaluating.

6. A circuit arrangement, comprising:

means for controlling a fan (10), means for detecting commutation times of the fan motor with the aid of a shunt (RS) that is connected in series to the fan, a capacitor that is connected in parallel to a discharging resistor and connected to a charging voltage by a first switch, a first oscillator, wherein the first switch is actuated by said first oscillator with a first oscillator frequency that corresponds to a multiple of the nominal frequency of the fan, a comparator for comparing the capacitor voltage with a voltage tapped by the shunt, a second oscillator for generating a timing signal for the counting process, and a counting arrangement with at least two counters and a sequence control unit, wherein the second oscillator is connected to the counting inputs of the counters by a second switch that is controlled by the comparator, wherein an active counter is designated by the sequence control unit, and the counts of the at least two counters are linked with one another, and wherein an evaluation device is provided for carrying out a comparison with a predetermined constraint and for generating a result signal indicating a commutation pulse of the fan motor.

7. The circuit arrangement according to claim 6, wherein the oscillator frequency of the first oscillator is an integral multiple of the nominal fan frequency.

8. The circuit arrangement according to claim 7, wherein the oscillator frequency of the first oscillator is at least 100-times the nominal fan frequency.

9. The circuit arrangement according to claim 6, wherein an amplifier is arranged between a tap on the shunt and the comparator and is changed over to several amplification ranges, wherein the change-over of the amplification range can be controlled with a signal from the sequence control unit.

10. A circuit arrangement, comprising:

means for controlling a fan, means for detecting commutation times of the fan motor with the aid of a shunt that is connected in series to the fan, a capacitor that is connected in parallel to a discharging resistor and connected to a charging voltage a first switch, a first oscillator, wherein the first switch is actuated by said first oscillator with a first oscillator frequency that corresponds to a multiple of the nominal frequency of the fan, a comparator for comparing the capacitor voltage across the capacitor with a voltage tapped by the shunt, a second oscillator for generating a timing signal for the counting process, a counting arrangement with at least two counters, and a shift register that is arranged between the output of the first counter and the input of the second counter and serves for the intermediate storage of the counts of the counters, wherein the second oscillator is connected to the counting inputs of the counters by a second switch that is controlled by the comparator, a sequence control unit for controlling the counters and the shift register, and an evaluation device for comparing the count of the second counter with a predetermined constraint and for generating a result signal indicating a commutation pulse of the fan motor.

11. The circuit arrangement according to claim 10, wherein the evaluation device comprises two digital/analog converters and two comparators for comparing the converted values with reference values.

12. The circuit arrangement according to claim 10, wherein the inverse count of the first counter is stored in the shift register.

* * * * *